United States Patent
Ueda et al.

(10) Patent No.: US 8,859,033 B2
(45) Date of Patent: Oct. 14, 2014

(54) METHOD FOR PRODUCING MAGNETIC RECORDING MEDIUM AND MAGNETIC RECORDING REPLAYING DEVICE

(75) Inventors: Manabu Ueda, Ichihara (JP); Yuji Murakami, Ichihara (JP); Akira Sakawaki, Ichihara (JP); Zhipeng Wang, Oyama (JP)

(73) Assignee: Showa Denko K.K., Tokyo (JP)

( * ) Notice: Subject to any disclaimer, the term of this patent is extended or adjusted under 35 U.S.C. 154(b) by 34 days.

(21) Appl. No.: 13/502,970

(22) PCT Filed: Oct. 20, 2010

(86) PCT No.: PCT/JP2010/068464
§ 371 (c)(1),
(2), (4) Date: Apr. 19, 2012

(87) PCT Pub. No.: WO2011/049120
PCT Pub. Date: Apr. 28, 2011

(65) Prior Publication Data
US 2012/0206834 A1    Aug. 16, 2012

(30) Foreign Application Priority Data
Oct. 20, 2009  (JP) .................................. 2009-241491

(51) Int. Cl.
*G11B 5/855*    (2006.01)
*B05D 1/32*    (2006.01)

(52) U.S. Cl.
CPC . *G11B 5/855* (2013.01); *B05D 1/32* (2013.01)
USPC ............................ 427/128; 427/272; 427/282

(58) Field of Classification Search
None
See application file for complete search history.

(56) References Cited

U.S. PATENT DOCUMENTS

| 4,448,800 | A | * | 5/1984 | Ehara et al. | ................... 438/639 |
| 6,753,043 | B1 | * | 6/2004 | Kuo et al. | .................... 427/526 |
| 6,753,130 | B1 | * | 6/2004 | Liu et al. | ....................... 430/313 |
| 2009/0127095 | A1 | | 5/2009 | Iwata et al. | |

FOREIGN PATENT DOCUMENTS

| JP | 05-205257 A | 8/1993 |
| JP | 2004-164692 A | 6/2004 |

(Continued)

OTHER PUBLICATIONS

International Search Report of PCT/JP2010/068464, dated Jan. 18, 2011.

*Primary Examiner* — Mandy Louie
(74) *Attorney, Agent, or Firm* — Sughrue Mion, PLLC

(57) ABSTRACT

A production method of a magnetic recording medium of the present invention includes: a step of forming a magnetic layer (2) on a non-magnetic substrate (1); a step of forming a dissoluble layer (3) on the magnetic layer (2); a step of forming a mask layer (4) on the dissoluble layer (3); a step of patterning the dissoluble layer (3) and the mask layer (4) to a shape corresponding to a magnetic recording pattern (2*a*); a step of performing a partial modification or removal of the magnetic layer (2) by use of the patterned mask layer (4); and a step of dissolving the dissoluble layer (3) with a chemical agent so as to remove the dissoluble layer (3) together with the mask layer (4) formed thereon from the top of the magnetic layer (2), wherein the magnetic recording medium has the magnetically-separated magnetic recording pattern (2*a*).

2 Claims, 3 Drawing Sheets

(56) References Cited

FOREIGN PATENT DOCUMENTS

| | | |
|---|---|---|
| JP | 2004-178793 A | 6/2004 |
| JP | 2004-178794 A | 6/2004 |
| JP | 2005-135455 A | 5/2005 |
| JP | 2006-209952 A | 8/2006 |
| JP | 2006-309841 A | 11/2006 |
| JP | 2009-129492 A | 6/2009 |
| JP | 2010-009709 A | 1/2010 |
| JP | 2010-146668 A | 7/2010 |

* cited by examiner

METHOD FOR PRODUCING MAGNETIC RECORDING MEDIUM AND MAGNETIC RECORDING REPLAYING DEVICE

CROSS REFERENCE TO RELATED APPLICATIONS

This application is a National Stage of International Application No. PCT/JP2010/068464 filed Oct. 20, 2010, claiming priority based on Japanese Patent Application No. 2009-241491 filed Oct. 20, 2009, the contents of all of which are incorporated herein by reference in their entirety.

TECHNICAL FIELD

The present invention relates to a method for producing a magnetic recording medium for use in a hard disk drive (HDD) or the like, and a magnetic recording and reproducing apparatus.

BACKGROUND ART

Recently, the applicability of magnetic recording apparatuses such as magnetic disk devices, flexible disk devices and magnetic tape devices has increased significantly, and the importance thereof has also increased. Also, the recording density of magnetic recording media used for these devices has been increased significantly. With the introduction of an MR head and a PRML technology, surface recording density has improved still more significantly. In recent years, GMR heads and TMR heads have also been introduced, which further increase the surface recording density by about 1.5 times per year.

Accordingly, there is a demand to further increase the recording density of these magnetic recording media. Thus, it is required to increase a coercive force, a signal-to-noise ratio (SNR) and resolution of magnetic layers. In recent years, efforts have been made to increase surface recording density by increasing linear recording density and track density.

The most recent magnetic recording apparatus has track density of as high as 250 kTPI (Track Per Inch). As the track density increases, however, magnetic recording information between adjacent tracks begins interfering with each other, which may easily cause a problem that a magnetizing transition area of a border area becomes a noise source that decreases the SNR. The decrease in the SNR causes a decrease in a bit error rate, which is an obstacle to an improvement in recording density.

In order to increase surface recording density, it is necessary to provide reduced-sized recording bits on the magnetic recording medium, each recording bit having maximum possible saturation magnetization and maximum possible magnetic film thickness. There is a problem, however, that the reduced-sized recording bit has a small magnetizing minimum volume per 1 bit and recorded data may disappear due to magnetization reversal caused by heat fluctuation.

Since adjacent tracks are close to each other in a high track density configuration, a significantly precise track servo technique is necessary for a magnetic recording/reproducing apparatus. Also, information is recorded on a larger number of tracks and reproduced in a smaller number of tracks in order to avoid influence from adjacent tracks as much as possible. In this manner, however, although influence between the tracks can be controlled to the minimum, it is difficult to obtain a sufficient reproduction output and thus to provide a sufficient SNR.

In order to avoid the above heat fluctuation problem and to provide a sufficient SNR and sufficient output, an attempt has been made to form a concavo-convex configuration along the tracks on the surface of the recording medium so as to physically separate the recording tracks from one another to increase the track density. Such a technique is usually referred to as a discrete track method, and a magnetic recording medium manufactured by this discrete track method is referred to as a discrete track medium. An attempt has also been made to provide a so-called patterned medium that has further divided data areas in the same track.

There is known, as an example of the discrete track medium, a magnetic recording medium in which a magnetic layer is formed on a non-magnetic substrate with a concavo-convex pattern formed on the surface to form a physically-separated magnetic recording track and a servo signal pattern (see, for example, Patent Literature 1).

The disclosed magnetic recording medium includes a ferromagnetic layer formed on the surface of a substrate with plural concavo-convex configurations via a soft magnetic layer, a protective film being formed on the surface of the ferromagnetic layer. The magnetic recording medium has, in its convex area, a magnetic recording area which is physically separated from the surrounding areas.

According to the magnetic recording medium, since formation of a magnetic wall in the soft magnetic layer can be avoided, influence of the heat fluctuation hardly occurs, and there is no interference between adjacent signals. Consequently, a high-density magnetic recording medium with less noise can be provided.

The discrete track method includes a method of forming tracks after a magnetic recording medium constituted of several thin film layers is formed, and a method of preliminarily forming a concavo-convex pattern directly on a substrate surface or on the thin film layer for track formation, and then forming a thin magnetic recording medium film (see, for example, Patent Documents 2 and 3).

Of these, the former method is referred to as a magnetic layer processing type. However, physical processing is conducted for the surface of a formed medium in this method. Therefore, there are problems in that a medium is likely to be contaminated during a production step and a production method becomes very complicated. Meanwhile, the latter method is referred to as an embossing type. In this method, a medium is hardly to be contaminated during a production step. However, a concavo-convex shape formed on a substrate is transferred to a film formed thereon. Therefore, there are problems in that the float attitude and float height of a recording/reproducing head, which performs recording/reproducing while floating on a medium, become unstable.

As the method of forming an area between magnetic tracks of a discrete track medium, there is disclosed a method of irradiating with laser or injecting nitrogen ions and oxygen ions into a preliminarily formed magnetic layer so as to change magnetic characteristics of subjected area (see, for example, Patent Literatures 4 to 6).

In addition, there is disclosed a method in which a concavo-convex pattern is formed on the surface of a magnetic layer, a non-magnetic layer is formed to cover this surface, and then, this surface of this non-magnetic layer is smoothened by oblique ion beam etching or CMP (Chemical Mechanical Polishing) (see, for example, Patent Literature 7).

CITATION LIST

Patent Literature

[Patent Literature 1]
Japanese Unexamined Patent Application, First Publication No. 2004-164692
[Patent Literature 2]
Japanese Unexamined Patent Application, First Publication No. 2004-178793
[Patent Literature 3]
Japanese Unexamined Patent Application, First Publication No. 2004-178794
[Patent Literature 4]
Japanese Unexamined Patent Application, First Publication No. Hei 5-205257
[Patent Literature 5]
Japanese Unexamined Patent Application, First Publication No. 2006-209952
[Patent Literature 6]
Japanese Unexamined Patent Application, First Publication No. 2006-309841
[Patent Literature 7]
Japanese Unexamined Patent Application, First Publication No. 2005-135455

SUMMARY OF INVENTION

Technical Problem

As a production method of a patterned medium, there is the method for forming a thin film of a continuous magnetic layer and then partially processing the magnetic layer or modifying the magnetic characteristics, to thereby form a magnetic recording pattern. When this method is applied, it is necessary to provide a mask layer which corresponds to a magnetic recording pattern on the surface of the continuous magnetic layer.

This mask layer is desired to have shielding property against ion beam and strength enough to endure partial processing and magnetic characteristics modification of a magnetic layer. Meanwhile, this mask layer is required to be easily removed after a patterning step of a magnetic layer. An example of the material that satisfies the aforementioned properties is hard carbon. Hard carbon has a high shielding property against inactive ion beam, etc., and can be gasified by oxygen plasma, etc.

However, plasma removal of a mask layer takes time, which deteriorates the productivity of a magnetic recording medium. Moreover, when plasma removal of a mask layer is tried to be accelerated, residues are likely to remain on the surface thereof, which deteriorates the flatness of the surface of a magnetic recording medium.

In addition, when the part, in which the patterning is insufficient due to dust, etc., exists during the step of forming a mask layer, plasma etching becomes insufficient in this part. Consequently, the removal of a mask layer becomes insufficient, which leaves protrusion. When plasma etching is enhanced to remove this protrusion, the damage against a magnetic layer tends to be big.

Also, there is the case where CMP (chemical Mechanical Polishing) is used for removal of a mask layer to try to accelerate removal speed. However, it is difficult to detect the stop position of polishing in CMP, and there is the case where even the surface of a magnetic layer is polished.

The present invention has been made in view of the aforementioned related art problems, and an object of the present invention is to provide a production method of a magnetic recording medium which enables to surely remove a mask layer at high speed, to appropriately remove a mask layer so as to form a processed surface with no protrusion, and to much improve the productivity. Also, another object of the present invention is to provide a magnetic recording/reproducing apparatus, which enables the more improvement in electromagnetic conversion characteristics by use of the magnetic recording medium produced by the aforementioned production method.

Solution to Problem

In order to achieve the aforementioned objects, the present inventors carried out the extensive research, and found the following knowledge. When a dissoluble layer is provided between a magnetic layer and a mask layer and this dissoluble layer is dissolved with a chemical agent, the mask layer can be surely removed at high speed from the surface of the magnetic layer without remaining. Consequently, the productivity of a magnetic recording medium is improved very much, and it is possible to produce the magnetic recording medium with high flatness. On the basis of such knowledge, the present invention was completed.

In other words, the present invention provides the following means.

(1) A production method of a magnetic recording medium, which has a magnetically-separated magnetic recording pattern, including:
  a step of forming a magnetic layer on the non-magnetic substrate;
  a step of forming a dissoluble layer on the magnetic layer;
  a step of forming a mask layer on a dissoluble layer;
  a step of patterning the dissoluble layer and the mask layer to a shape corresponding to the magnetic recording pattern;
  a step of performing a partial modification or removal of the magnetic layer by use of the patterned mask layer; and
  a step of dissolving the dissoluble layer with a chemical agent so as to remove the dissoluble layer together with the mask layer formed thereon from the top of the magnetic layer.

(2) The production method of a magnetic recording medium according to (1), wherein the dissoluble layer is formed of a metal, and the chemical agent is an acid or alkali.

(3) The production method of a magnetic recording medium according to (2), wherein the metal is molybdenum, and the chemical agent is at least one selected from the group consisting of a hydrogen peroxide solution, sulfuric acid, nitric acid, and phosphoric acid.

(4) The production method of a magnetic recording medium according to (3), wherein the chemical agent is the hydrogen peroxide solution.

(5) The production method of a magnetic recording medium according to (2), wherein the metal is an aluminum alloy, and the chemical agent is at least one selected from the group consisting of sodium hydroxide and potassium hydroxide.

(6) The production method of a magnetic recording medium according to (1), wherein the dissoluble layer is formed of an organic material, and the chemical agent is an organic solvent.

(7) A magnetic recording/reproducing apparatus including:
  the magnetic recording medium produced by the production method according to any one of (1) to (6);
  a medium driving unit that drives the magnetic recording medium in a recording direction;
  a magnetic head that performs a recording operation and a reproducing operation to the magnetic recording medium;

a head moving unit that moves the magnetic head relative to the magnetic recording medium; and a recording/reproducing signal processing unit that inputs signals to the magnetic head and reproduces signals output from the magnetic head.

Advantageous Effects of Invention

According to the present invention, it is possible to surely remove the mask layer provided on the magnetic layer at high speed, and therefore, it is possible to produce the magnetic recording layer with high flatness in high productivity. Also, in the magnetic recording/reproducing apparatus obtained by using this magnetic recording medium, the further improvement in electromagnetic conversion characteristics can be achieved by taking advantage of high flatness thereof.

DESCRIPTION OF EMBODIMENTS

Figure 1A:
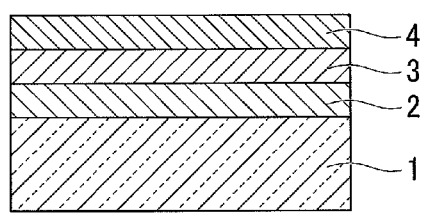
FIG. 1A is a cross-sectional view for explaining an example of the production method of a magnetic recording medium to which the present invention is applied.

Hereinafter, an embodiment of the present invention is described in details with reference to the accompanying drawings.

For the ease of understanding, characteristic features in the drawings referred to in the following description are enlarged in some drawings. Accordingly, components are not necessarily illustrated in actual dimensional ratios.

(Production Method of Magnetic Recording Medium)

Firstly, an example of the production method of a magnetic recording medium, to which the present invention is applied, is described.

As shown in FIG. 1A to FIG. 1G, the present invention is a production method of a magnetic recording medium, which has a magnetically-separated magnetic recording pattern, including: a step of forming a magnetic layer 2 on a non-magnetic substrate 1; a step of forming a dissoluble layer 3 on the magnetic layer 2; a step of forming a mask layer 4 on the dissoluble layer 3; a step of forming a resist layer 5 on the mask layer 4; a step of patterning the surface of the resist layer 5 to a shape corresponding to the magnetic recording pattern; a step of patterning the dissoluble layer 3 and the mask layer 4 by use of the patterned resist layer 5; a step of partially removing the magnetic layer 2 by use of the patterned mask layer 4; a step of dissolving the dissoluble layer 3 with a chemical agent so as to remove the dissoluble layer 3 together with the mask layer 4 formed thereon from the top of the magnetic layer 2; a step of forming a protective layer 5 thereon; and a step of forming a lubricating film (unillustrated) on the protective layer 5.

Figure 1B:
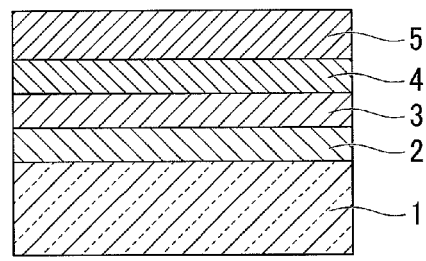
FIG. 1B is a cross-sectional view for explaining an example of the production method of a magnetic recording medium to which the present invention is applied.
Figure 1C:
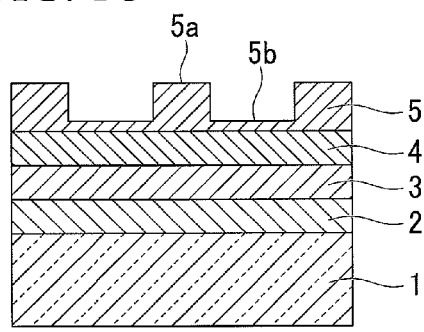
FIG. 1C is a cross-sectional view for explaining an example of the production method of a magnetic recording medium to which the present invention is applied.

For the production of a magnetic recording medium, firstly, the magnetic layer 2, the dissoluble layer 3 and the mask layer 4 are sequentially laminated on the non-magnetic substrate 1 as illustrated in FIG. 1A. On this mask layer 3, the resist layer 5 is formed as illustrated in FIG. 1B, and then, the resist layer 5 is patterned to a shape corresponding to the magnetic recording pattern using a photolithography or a nanoimprint method, etc. Accordingly, the pattern, in which the part corresponding to the magnetic recording pattern is the convex 5a and the interspace thereof is the concavo 5b, is formed on the surface of the resist layer 5 as illustrated in FIG. 1C.

A nanoimprint method is preferably used when the resist layer 5 is patterned. In this nanoimprint method, a material that is cured by irradiation with radiation is used for a resist layer 5, and a pattern is transferred to this resist layer 5 using a stamp (not illustrated).

In the present invention, it is preferable that the resist layer 5 be irradiated with radiation after the step of transferring a pattern. By doing this, the shape of a stamp can be precisely transferred to the resist layer 5, and it is possible to improve formation characteristics of a magnetic recording pattern.

When a pattern is transferred to the resist layer 5 using a stamp, the stamp is pressed against the resist layer 5 in a state where the resist layer 5 has high fluidity. In this state, the resist layer 5 is cured by irradiating with radiation, and then the stamp is separated from the resist layer 5. Accordingly, a shape of a stamp can be precisely transferred to the resist layer 5.

Examples of the method of irradiating the resist layer 5 with radiation in a state where a stamp is pressed against the resist layer 5 include a method of irradiating with radiation from the opposite side of the stamp, namely, the non-magnetic substrate 1; a method of selecting a substance capable of transmitting radiation as the material of a stamp and irradiating with radiation form the stamp side; a method of irradiating with radiation from the lateral side of a stamp; and a method of irradiation with radiation through heat conduction from a stamp or the non-magnetic substrate 1 using radiation having high conductivity to a solid, such as heat rays.

The radiation in the present invention refers to electromagnetic waves in a broad sense, such as heat rays, visible rays, ultraviolet rays, X-rays and gamma rays. The material that is cured by irradiation with radiation may be a thermosetting resin for heat rays or an ultraviolet-curable resin for ultraviolet rays.

Of these materials, it is particularly preferable to use ultraviolet-curable resins such as novolak-based resins, acrylic acid esters and alicyclic epoxy resins as the resist layer 5. Also, it is preferable to use a resin or glass having the high transmission property for ultraviolet rays.

In the step of transferring a pattern, it is possible to use a stamper obtained by forming a fine track pattern on a metal plate by a method such as electron beam lithography as an example of a stamp. Since a stamper is required to have hardness and durability enough for the aforementioned process, for example, Ni is used. However, the material of a stamper is not limited to such a material as long as it achieves the object described above. In addition to a conventional track for recording data, servo signal patterns such as a burst pattern, a gray code pattern and a preamble pattern, may be formed on the stamp.

Next, an oxygen gas is introduced into an ICP (Inductively Coupled Plasma) apparatus, and the part of the mask layer 4, which is not covered with the patterned resist layer 5, is removed by reactive ion etching.

For example, a carbon film is preferably used as the mask layer 4. A carbon film can be formed by a sputtering method or a CVD method, but a highly densified carbon film can be formed by a CVD method. In addition, the dry etching using an oxygen gas (reactive ion etching or reactive ion milling) can be easily performed for a carbon film. Therefore, a residue can be reduced, and the surface of a magnetic recording medium can be protected from contamination.

The thickness of the mask layer 4 is preferably within a range from 5 to 40 nm, and more preferably 10 to 30 nm. When the thickness of the mask layer 4 is less than 5 nm, the shape of the edge part of the mask layer 4 collapses, and the formation characteristics of the magnetic recording pattern deteriorates. Moreover, the ion that has transmitted through the resist layer 5, the mask layer 4 and the dissoluble layer 3 enters the magnetic layer 2, which deteriorates the magnetic characteristics of the magnetic layer 2. Meanwhile, when the thickness of the mask layer 4 is more than 40 nm, the etching time for the mask layer 4 takes becomes long, which deteriorates the productivity. In addition, a residue is likely to remain on the surface of the magnetic layer 2 when the mask layer 4 is subjected to etching.

Figure 1D:
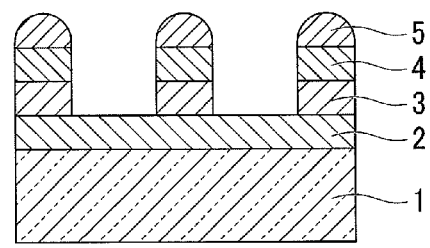
FIG. 1D is a cross-sectional view for explaining an example of the production method of a magnetic recording medium to which the present invention is applied.

Then, the part of the dissoluble layer 3, which exists under the mask layer 4 and is not covered with the resist layer 5 and the mask layer 4, is partially and continuously removed by a dry etching such as reactive ion etching or ion milling. Accordingly, as illustrated in FIG. 1D, the mask layer 4 and the dissoluble layer 3 can be patterned to a shape corresponding to the magnetic recording pattern.

Figure 1E:
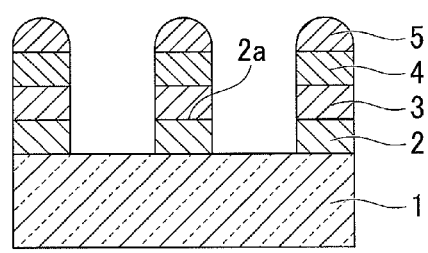
FIG. 1E is a cross-sectional view for explaining an example of the production method of a magnetic recording medium to which the present invention is applied.

Next, the part of the magnetic layer 2, which exists under the dissoluble layer 3 and is not covered with the resist layer 5, the mask layer 4 and the dissoluble layer 3, is partially and continuously removed by dry etching such as reactive ion etching or reactive ion milling to form the magnetically-separated magnetic recording pattern 2a as illustrated in FIG. 1E.

In the present invention, it is preferable to use an oxygen gas when the part of the mask layer 4, which is not covered with the resist layer 5, is removed by reactive ion etching using the aforementioned ICP apparatus. Meanwhile, the subsequent dry etching of the dissoluble layer 3 and the magnetic layer 2 is preferably performed using a reactive ion etching apparatus such as ICP or RIE while introducing an inert gas such as an Ar gas or an $N_2$ gas thereto. In other words, it is preferable in the present invention to optimally select the respective milling ions for the mask layer 4 and a milling ion for the dissoluble layer 3 and the magnetic layer 2. For example, it is preferable to select ICP using an oxygen gas for the mask layer 4 and to select an ion milling using a gas such as Ar or N2 for the dissoluble layer 3 and the magnetic layer 2.

The method described above is used in the present invention, and therefore, the edge part of the remaining magnetic layer 2 can be perpendicularly formed. This is because the perpendicularly standing shape of the dissoluble layer 3 and the mask layer 4 on the magnetic layer 2 induces the magnetic layer 2 to have the same shape. Therefore, it is possible to form the magnetic layer 2 having good fringe characteristics (the magnetic recording pattern 2a).

Figure 1F:
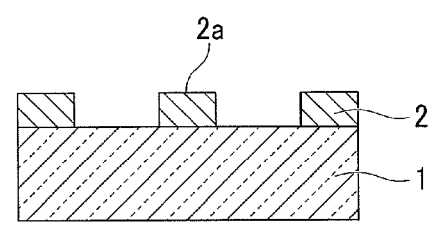
FIG. 1F is a cross-sectional view for explaining an example of the production method of a magnetic recording medium to which the present invention is applied.

Next, the dissoluble layer 3 is dissolved with a chemical agent as illustrated in FIG. 1F, and therefore, the dissoluble layer 3 can be surely removed at high speed together with the mask layer 4 and the resist layer 5 thereon without remaining on the surface of the magnetic layer 2. In the present invention, the material constituting the dissoluble layer 3 and the chemical agent for dissolving this need to be appropriately selected in order to surely remove the dissoluble layer 3 at high speed without remaining. Specifically, it is preferable in the present invention to use a metal for the dissoluble layer 3 and an acid or alkali for the chemical agent. In addition, the dissoluble layer 3 can have a multilayer structure to be surely removed at high speed from the magnetic layer 2.

Because the magnetic layer 2 under the dissoluble layer 3 contains a metal element, it is preferable to use a metal that is more dissoluble with the chemical agent than the magnetic layer 2 for the dissoluble layer 3 and to use an acid that does not damage the magnetic layer 2 as the chemical agent. It is usual for the magnetic layer 2 to use a CoCr-based magnetic alloy or a material obtained by adding an oxide such as $SiO_2$ to this CoCr-based magnetic alloy. Therefore, it is preferable to use a material mainly containing Mo, Cr, Ti, W, Mn, NiMn, Sn, Zn or Al, etc. for the dissoluble layer 3. Meanwhile, it is preferable to use $H_2O_2$, $HNO_3$, $H_3PO_4$ or an extremely weak concentration $H_2SO_4$ solution, etc. as the acid chemical agent. Of these, it is preferable to use Mo for the dissoluble layer 3 and to use about 0.1% to 10% $H_2O_2$ solution as the chemical agent.

Meanwhile, when an alloy containing an amphoteric metal such as Al is used for the dissoluble layer 3, an alkaline agent can be used as the chemical agent instead of the aforementioned acid because Al can be dissolved with both of an acid and alkali. Examples of an alkaline agent include sodium hydroxide and potassium hydroxide. Of these, it is particularly preferable to use about 0.1% to 10% sodium hydroxide or potassium hydroxide solution as the chemical agent when an aluminum alloy is used for the dissoluble layer 3.

In the present invention, it is possible to use an organic material for the dissoluble layer 3 and an organic solvent as the chemical agent as the combination of the chemical agent and the material constituting the dissoluble layer 3, which hardly damages the magnetic layer 2. This is because an organic solvent does not generally undergo a reaction with a CoCr-based magnetic alloy, etc. constituting the magnetic layer 2. It is possible to use known materials and solvents as an organic material that can be used in the present invention and an organic solution capable of dissolving this organic material. Examples of an organic material include novolak-based resins, acrylic acid esters and alicyclic epoxy resins, and examples of an organic solution include acetone, ketone, hexane, tetrachloroethylene, toluene and a terpin oil. These organic materials and organic solutions can be used in combination. Herein, the concentration of the chemical agent can be appropriately selected in terms of the thickness of the dissoluble layer 3, a type of a material constituting the dissoluble layer 3 and reactivity with a material constituting the magnetic layer 2.

The dissolving time of the dissoluble layer 3 with the chemical agent is appropriately selected in terms of the concentration and temperature of the chemical agent and the material and thickness of the dissoluble layer 3, etc. It is preferable to complete the dissolution of the dissoluble layer 3 for 10 seconds to 1 hour in order to avoid the damage to the magnetic layer 2 due to the chemical agent as much as possible.

In the present invention, the washing step using pure water and the neutralization step using an acid or alkaline chemical agent are preferably applied in order to remove the chemical agent attaches to the substrate surface through the step of dissolving the dissoluble layer 3 with the chemical agent. In addition, the scrub washing step using urethane foam is effectively applied to clean the substrate surface in case the residues of the mask layer 4 and the resist layer 5 attach to the substrate surface.

Figure 1G:
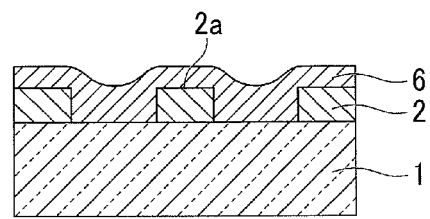
FIG. 1G is a cross-sectional view for explaining an example of the production method of a magnetic recording medium to which the present invention is applied.

Next, the protective layer 6 is formed in such a manner as to cover the surface from which the dissoluble layer 3, the mask layer 4 and the resist layer 5 have been removed as illustrated in FIG. 1G. For the formation of the protective layer 6, it is general to use the method of forming a DLC (Diamond Like Carbon) thin film by P-CVD, etc., but there is no limitation to this method. Also, this protective layer 6 is formed in such a manner as to have a thickness enough to be embedded in the part where the magnetic layer 2 has been removed.

Then, the lubricating film (not illustrated) is formed by coating a lubricant on the protective layer 6. Examples of a lubricant used for the lubricating film include a fluorine-based lubricant, a carbon hydride-based lubricant or mixture thereof, and the lubricating film with a thickness of 1 to 4 nm is usually formed.

The magnetic recording medium can be produced through the aforementioned steps.

In the production method of the magnetic recording medium to which the present invention is applied, the dissoluble layer 3 is provided between the magnetic layer 2 and the mask layer 4, and this dissoluble layer 3 is dissolved with the chemical agent. Therefore, all the mask layer 4 can be surely removed at high speed from the surface of the magnetic layer 2 without remaining In a conventional production method, the mask layer 4 made of the carbon film is removed by ashing using an oxygen plasma. In this case, the defect parts, in which the pattern is not formed, have small surface area, and therefore, the mask layer 4 almost remains without being removed. That is why the flatness of the magnetic recording medium deteriorates and the problems such as head crush occur. Meanwhile, when ashing is enhanced to remove the mask layer 4, the magnetic layer 2 thereunder is damaged.

In contrast, in the present invention, the dissoluble layer 3 is removed together with the mask layer 4 by dissolving, with the chemical agent, the dissoluble layer 3 provided between the magnetic layer 2 and the mask layer 4. Therefore, the mask layer 4 can be surely removed at high speed without damaging the surface of the magnetic layer 2.

According to the present invention, it is possible to surely remove the mask layer 4 provided on the magnetic layer 2 at high speed, and therefore, it is possible to produce the magnetic recording layer with high flatness in high productivity. Also, in the magnetic recording/reproducing apparatus obtained by using this magnetic recording medium, the further improvement in electromagnetic conversion characteristics can be achieved.

Next, another example of the production method of a magnetic recording medium, to which the present invention is applied, is described.

This example is the production method of a magnetic recording medium having a magnetically-separated magnetic recording pattern in which the method of partially modifying the magnetic characteristics of the magnetic layer 2 is applied as the method of forming a magnetic recording pattern on the magnetic layer 2, for example.

As shown in FIG. 2A to FIG. 2G, the aforementioned production method of a magnetic recording medium includes: a step of forming a magnetic layer 2 on a non-magnetic substrate 1; a step of forming a dissoluble layer 3 on the magnetic layer 2; a step of forming a mask layer 4 on the dissoluble layer 3; a step of forming a resist layer 5 on the mask layer 4; a step of patterning the surface of the resist layer 5 to a shape corresponding to the magnetic recording pattern; a step of patterning the dissoluble layer 3 and the mask layer 4 by use of the patterned resist layer 5; a step of partially modifying the magnetic layer 2 by use of the patterned mask layer 4; a step of dissolving the dissoluble layer 3 with a chemical agent so as to remove the dissoluble layer 3 together with the mask layer 4 formed thereon from the top of the magnetic layer 2; a step of forming a protective layer 5 thereon; and a step of forming a lubricating film (unillustrated) on the protective layer 5.

Figure 2A:
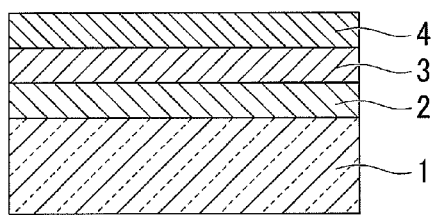
FIG. 2A is a cross-sectional view for explaining another example of the production method of a magnetic recording medium to which the present invention is applied.
Figure 2B:
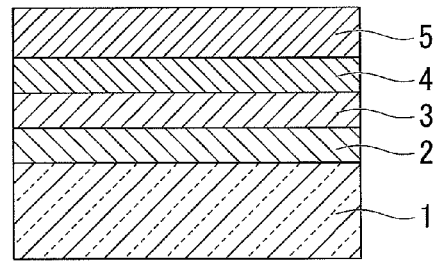
FIG. 2B is a cross-sectional view for explaining another example of the production method of a magnetic recording medium to which the present invention is applied.
Figure 2C:
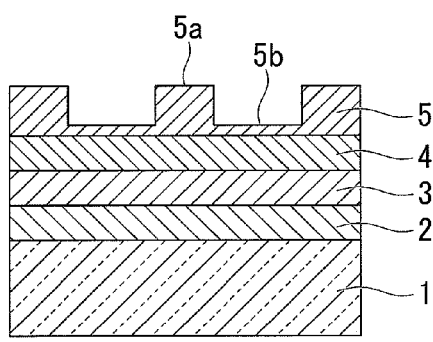
FIG. 2C is a cross-sectional view for explaining another example of the production method of a magnetic recording medium to which the present invention is applied.
Figure 2D:
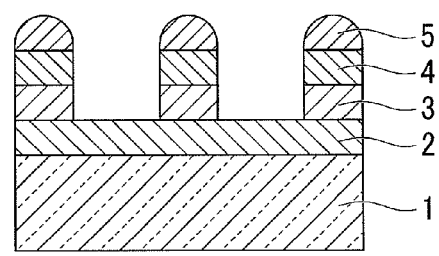
FIG. 2D is a cross-sectional view for explaining another example of the production method of a magnetic recording medium to which the present invention is applied.

The steps illustrated in FIG. 2A to FIG. 2D are basically the same as the steps illustrated in FIG. 1A to FIG. 1D. Therefore, the detailed description of the steps illustrated in FIG. 2A and FIG. 2D is abbreviated.

Figure 2E:
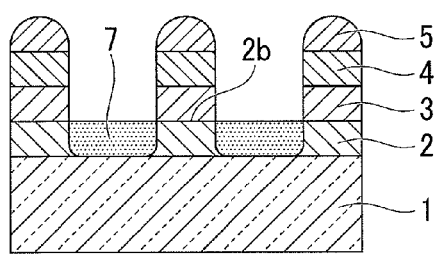
FIG. 2E is a cross-sectional view for explaining another example of the production method of a magnetic recording medium to which the present invention is applied.

Next, the part of the magnetic layer 2, which exists under the dissoluble layer 3 and is not covered with the resist layer 5, the mask layer 4 and the dissoluble layer 3, is partially modified by reactive plasma or reactive ions, etc. to form the magnetically-separated magnetic recording pattern 2b as illustrated in FIG. 2E.

In the present invention, the magnetically-separated magnetic recording pattern 2b refers to the pattern in which the unmodified area is separated by the area obtained by modifying the magnetic characteristics of the part of the magnetic layer 2, preferably non-magnetic area 7 obtained by demagnetizing the part of the magnetic layer 2, when the magnetic recording medium is viewed from the surface side. In other words, even if the magnetic recording area is not separated at the bottom of the magnetic layer 2, it is possible to achieve the object of the present invention as long as the magnetic layer 2 is separated when being viewed from the surface side. Such a pattern is also involved in the concept of the magnetic recording pattern 2b in the present invention.

Also, the modification of the magnetic layer 2 for forming the magnetic recording pattern 2b refers to partial change of coercive force and residual magnetization of the magnetic layer 2 for the purpose of patterning the magnetic layer 2, and the change refers to a decrease in coercive force and a decrease in residual magnetization.

Particularly, as the modification of magnetic characteristics, it is preferable to apply the method in which the magnetization amount of the part of the magnetic layer 2, which has been exposed to reactive plasma or reactive ions, is changed to 75% or less, preferably 50% or less, of that of the unprocessed part, and the coercive force of the exposed part is changed to 50% or less, preferably 20% or less, of the unprocessed part. When the discrete track type magnetic recording medium is produced by the method described above, bleeding can be eliminated during magnetic recording of this medium, and it is possible to provide the magnetic recording medium with high surface recording density. In other words, in the magnetic recording medium obtained by the production method of the present invention, it is possible to prevent the magnetic recording at the part of the magnetic recording pattern 2b from causing the magnetization at the periphery thereof (the area illustrated by reference sing 7) and broadening the magnetic recording area.

Moreover, in the present invention, the area (non-magnetic area 7), which separates a magnetic recording track and a servo signal pattern section, can be realized by exposing the formed magnetic layer 2 to reactive plasma or reactive ions so as to convert the magnetic layer 2 into an amorphous state. Namely, the modification of magnetic characteristics of the magnetic layer 2 also includes variation of a crystal structure of the magnetic layer 2.

In the present invention, the conversion of the magnetic layer 2 into an amorphous state refers to conversion of atomic arrangement of the magnetic layer 2 into a form of irregular atomic arrangement with no long-distance order, and more specifically refers to conversion into a state where fine crystal grains having a grain size of less than 2 nm are arranged at random. When the state of atomic arrangement is confirmed by an analytical method, a state where a peak assigned to a crystal plane is not recognized and only halo is recognized is confirmed by X-ray diffraction or electron beam diffraction.

Examples of the reactive plasma include inductively coupled plasma (ICP) and reactive ion plasma (RIE). Also, examples of the reactive ions include reactive ion that exists in inductively coupled plasma and reactive ion plasma.

As the inductively coupled plasma, high-temperature plasma can be exemplified, which obtained by applying a high voltage to a gas thereby converting the gas into plasma, and generating Joule heat caused by eddy current inside plasma by means of high-frequency variable magnetic field. The inductively coupled plasma has high electron density and can modify magnetic characteristics with high efficiency in a magnetic layer with a wide area as compared with the case where a discrete track medium is produced using conventional ion beam.

The reactive ion plasma is highly reactive plasma obtained by adding a reactive gas such as $O_2$, $SF_6$, $CHF_3$, $CF_4$ or $CCl_4$ in plasma. The use of such plasma can realize the modification of magnetic characteristics of the magnetic layer 2 with high efficiency.

In the present invention, although the magnetic layer 2 is modified by exposing the magnetic layer 2 to reactive plasma, it is preferred to realize the modification by the reaction of magnetic metal constituting the magnetic layer 2 with atoms or ions in reactive plasma.

In this case, examples of the reaction include a change in crystal structure of magnetic metals caused by penetration of atoms in reactive plasma into magnetic metals, a change in composition of magnetic metals, oxidation of magnetic metals, nitriding of magnetic metals and silicification of magnetic metals.

Particularly, it is preferred that the magnetic layer 2 be oxidized by preparing reactive plasma containing oxygen atoms so as to react the magnetic metal constituting the magnetic layer 2 and the oxygen atoms within reactive plasma. The partial oxidation of the reactive layer 2 can efficiently reduce residual magnetization and coercive force, etc. of the oxidized part. Therefore, the magnetic recording medium with a magnetic recording pattern can be produced by short-time reactive plasma processing.

Also, it is preferred that the reactive plasma contain halogen atoms. It is particularly preferable to use F atoms as halogen atoms. Halogen atoms may be added to the reactive plasma together with oxygen atoms, or may be added to the reactive plasma without oxygen atoms. As described above, when oxygen atoms, etc. are added to the reactive plasma, the magnetic metal constituting the magnetic layer 2 can be reacted with the oxygen atoms, etc., to thereby modify the magnetic characteristics of the magnetic layer 2. In this case, the reactivity can be further enhanced by preparing the reactive plasma containing halogen atoms.

Even when oxygen atoms are not added to the reactive plasma, halogen atoms can be reacted with the magnetic alloy, to thereby modify the magnetic characteristics of the magnetic layer 2. Detailed reason is not apparent but is considered that a foreign material formed on the surface of the magnetic layer 2 is etched by halogen atoms in reactive plasma thereby cleaning the surface of the magnetic layer 2, resulting in an enhancement in reactivity of the magnetic layer 2.

It is also considered that the cleaned surface of the magnetic layer undergoes a reaction with halogen atoms with high efficiency. It is particularly preferable to use F atoms as the halogen atoms having such effects.

Figure 2F:
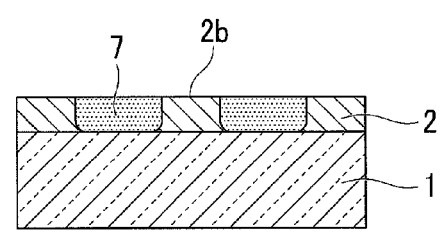
FIG. 2F is a cross-sectional view for explaining another example of the production method of a magnetic recording medium to which the present invention is applied.
Figure 2G:
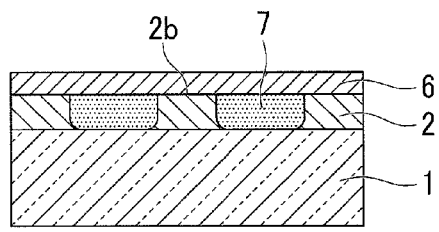
FIG. 2G is a cross-sectional view for explaining another example of the production method of a magnetic recording medium to which the present invention is applied.

The steps illustrated in FIG. 2F and FIG. 2G are basically the same as the steps illustrated in FIG. 1F and FIG. 1G. Therefore, the detailed description of the steps illustrated in FIG. 2F and FIG. 2G is abbreviated.

Even in the production steps illustrated in FIG. 2A to FIG. 2G, the dissoluble layer 3 is removed together with mask layer 4 by dissolving, with the chemical agent, the dissoluble layer 3 provided between the magnetic layer 2 and the mask layer 4. Therefore, the mask layer 4 can be surely removed at high speed without damaging the surface of the magnetic layer 2. Consequently, the magnetic recording medium with high flatness can be produced in high productivity.

Also, the magnetic recording medium produced by the steps illustrated in FIG. 2A to FIG. 2G has a more highly flat surface than the magnetic recording medium produced by the steps illustrated in FIG. 1A to FIG. 1G. Therefore, the float height of the magnetic head can be reduced, and it is possible to obtain the magnetic recording medium with high recording density.

It should be noted that the present invention is not limited to the aforementioned embodiments, and modifications may be made without departing from the spirit and scope of the present invention.

In the present invention, examples of the method of forming the magnetic recording pattern on the magnetic layer 2 include the method in which the part of the magnetic layer 2, which exists under the patterned mask layer 4 and the dissoluble layer 3 and is not covered with the resist layer 5, the mask layer 4 and the dissoluble layer 3, is partially removed to form the concave part on the magnetic layer 2, and then, the magnetic characteristics of this concave part is partially modified.

Moreover, in the present invention, the magnetic layer 2 may be partially removed, the non-magnetic layer may be formed to cover the surface subjected to the removal of the magnetic layer 2, and then, the non-magnetic layer may be subjected to polishing processing using CMP (Chemical Mechanical Polishing) until the magnetic layer 2 is exhibited. This process can produce the state where the non-magnetic layer is embedded in the interspace of the magnetic layer 2 on which the magnetic recording pattern is formed.

(Magnetic Recording Medium)

Figure 3:
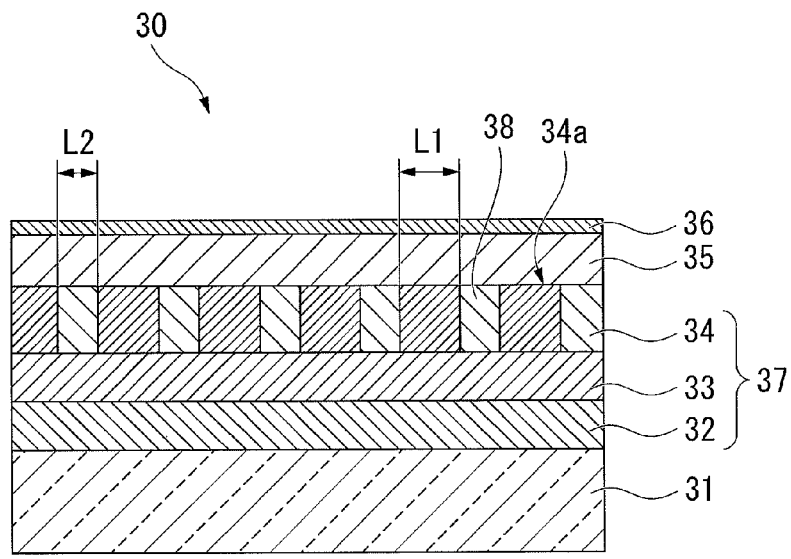
FIG. 3 is a cross-sectional view showing an example of the magnetic recording medium produced by applying the present invention.

Next, the specific configuration of the magnetic recording medium produced by applying the present invention is described in details with reference to the discrete track type magnetic recording medium 30 illustrated in FIG. 3.

It should be noted that the magnetic recording medium 30 exemplified below is just one of examples, the magnetic recording medium produced by applying the present invention is not limited to such configuration, and modifications may be made without departing from the spirit and scope of the present invention.

As shown in FIG. 3, this magnetic recording medium 30 has such a construction that a soft magnetic layer 32, an intermediate layer 33, a recording magnetic layer 34 having a magnetic recording pattern 34a and a protective layer 35 are sequentially laminated on both surfaces of a non-magnetic substrate 31, and also a lubricating film 36 is formed on the outermost layers. Also, a soft magnetic layer 32, an intermediate layer 33 and a recording magnetic layer 34 constitute a magnetic layer 37. In FIG. 3, only one surface of the non-magnetic substrate 31 is shown.

Examples of the non-magnetic substrate 31 include Al-based Al alloy substrates such as Al—Mg alloys; glass substrates such as soda-lime glass, aluminosilicate-based glass and crystallized glass; silicon substrates; titanium substrates; ceramic substrates; and resin substrates. Of these, Al alloy substrates, glass substrates and silicon substrates are preferably used. Also, an average surface roughness (Ra) of the non-magnetic substrate 31 is preferably 1 nm or less, more preferably 0.5 nm or less and much more preferably 0.1 nm or less.

The soft magnetic layer 32 is provided so as to increase a component, which is in a direction perpendicular to a surface of a substrate, of a magnetic flux to be generated from a magnetic head, and to fix the direction of the magnetization of the perpendicular magnetic layer 4, in which information is recorded, more strongly to the direction perpendicular to the non-magnetic substrate 1. This action becomes more remarkable when a magnetic monopole head for perpendicular recording is used as a magnetic head for recording and reproducing.

For example, soft magnetic materials containing Fe, Ni, and Co can be used for the soft magnetic layer 32. Specific examples of a soft magnetic material include a CoFe-based alloy (such as CoFeTaZr or CoFeZrNb), a FeCo-based alloy (such as FeCo or FeCoV), a FeNi-based alloy (such as FeNi, FeNiMo, FeNiCr or FeNiSi), a FeAl-based alloy (such as FeAl, FeAlSi, FeAlSiCr, FeAlSiTiRu or FeAlO), a FeCr-based alloy (such as FeCr, FeCrTi or FeCrCu), a FeTa-based alloy (such as FeTa, FeTaC or FeTaN), a FeMg-based alloy (such as FeMgO), a FeZr-based alloy (FeZrN), a FeC-based alloy, a FeN-based alloy, a FeSi-based alloy, a FeP-based alloy, FeNb-based alloy, a FeHf-based alloy and a FeB-based alloy.

The intermediate layer 33 can miniaturize the crystal grains of the magnetic layer 37, and can improve the recording/reproducing property. Such material is not particularly limited, but the material having hcp structure, fcc structure or amorphous structure is preferred. Particularly, a Ru-based alloy, a Ni-based alloy, a Co-based alloy, a Pt-based alloy, a Cu-based alloy are preferred. Moreover, these alloys may be multilayered. For example, it is preferable to use the multilayer in which a Ni-based alloy and a Ru-based alloy are laminated from the substrate side, the multilayer in which a Co-based alloy and a Ru-based alloy are laminated from the substrate side, and the multilayer in which a Pt-based alloy and a Ru-based alloy are laminated from the substrate side.

For example, a Ni-based alloy is preferably at least one material selected from the group consisting of a NiW alloy, a NiTa alloy, a NiNb alloy, a NiTi alloy, a NiZr alloy, a NiMn alloy and a NiFe alloy, each containing Ni at 33 to 96 atom %. Also, a Ni-based alloy may be a non-magnetic material that contains Ni at 33 to 96 atom % and one element or two or more elements selected from the group consisting of Sc, Y, Ti, Zr, Hf, Nb, Ta and C. In this case, the content of Ni is preferably within a range from 33 to 96 atom % to hold the effects of the intermediate layer 33 without having magnetic characteristics.

The thickness of the intermediate layer 33 (the total thickness in the case of a multilayer) is preferably within a range from 5 to 40 nm, and more preferably from 8 to 30 nm. When the thickness of the intermediate layer 33 is within the aforementioned range, the perpendicular orientation of the perpendicular magnetic layer is particularly high, and the distance between the magnetic head and the soft magnetic layer can be shortened during recording. Therefore, the recording/reproducing properties can be improved without deteriorating resolution of reproducing signal.

The magnetic layer 37 may be a horizontal magnetic layer for an in-plane magnetic recording medium or a perpendicular magnetic layer for a perpendicular magnetic recording medium, but a perpendicular magnetic layer is preferred to realize more high recording density. Also, the magnetic layer 37 is preferably formed of an alloy containing Co as a main component. For example, it is possible to use a CoCrPt-based, CoCrPtB-based or CoCrPtTa-based magnetic layer or a magnetic layer with a granular structure obtained by adding an oxide such as $SiO_2$ or $Cr_2O_3$ to the aforementioned magnetic layer.

In the case of a perpendicular magnetic recording medium, it is possible to use a laminate including the soft magnetic layer 32 made of a FeCo alloy (such as FeCoB, FeCoSiB, FeCoZr, FeCoZrB, FeCoZrBCu), a FeTa alloy (such as FeTaN or FeTaC) or a Co alloy (such as CoTaZr or CoZrNb or CoB), each having soft magnetic characteristics; the intermediate layer 33 made of Ru, etc.; the recording magnetic layer 34 made of 60Co-15Cr-15Pt alloy or 70Co-5Cr-15Pt-10$SiO_2$ alloy. Also, an orientation-regulating film made of Pt, Pd, NiCr or NiFeCr, etc. may be laminated between the soft magnetic layer 32 and the intermediate layer 33.

Meanwhile, in the case of an in-plane magnetic recording medium, it is possible to use a laminate including a non-magnetic CrMo ground layer and a ferromagnetic CoCrPtTa magnetic layer as the magnetic layer 37.

The thickness of the magnetic layer 37 may be 3 nm or more and 20 nm or less, and preferably 5 nm or more and 15 nm or less. The thickness can be adjusted so as to obtain a sufficient head input/output according to a type of a magnetic alloy to be used and a laminated structure thereof. Also, the magnetic layer 37 is required to have a thickness of no less than a certain level to obtain an output of no less than a certain level during reproducing. Meanwhile, it is general that the respective parameters, which show recording/reproducing properties, deteriorate as an output increases. Therefore, the thickness of the magnetic layer 37 is required to be adjusted to an optimal thickness. The magnetic layer 37 is normally formed in a thin-film shape by a sputtering method.

It is preferable that the magnetic layer 37 with a granular structure contain at least Co and Cr as a magnetic particle, and contain, in grain boundary of the magnetic particle, one or two or more selected from the group consisting of at least a Si oxide, a Cr oxide, a Ti oxide, a W oxide, a Co oxide, a Ta oxide and a Ru oxide. Specific examples thereof include CoCrPt—Si oxide, CoCrPt—Cr oxide, CoCrPt—W oxide, CoCrPt—Co oxide, CoCrPt—Cr oxide-W oxide, CoCrPt—Cr oxide-Ru oxide, CoRuPt—Cr oxide-Si oxide, and CoCrPtRu—Cr oxide-Si oxide.

The average particle diameter of a magnetic crystal particle with a granular structure is preferably 1 nm or more and 12 nm or less. Also, the total amount of oxides existing within a magnetic layer is preferably within a range from 3 to 15 mol %. Also, examples of a magnetic layer with no granular structure include a layer obtained by using a magnetic alloy containing Co and Cr, and preferably Pt.

Moreover, the magnetic recording medium 30 is a so-called discrete type magnetic recording medium in which the magnetic recording pattern 34a formed on the recording magnetic layer 34 is magnetically separated by the magnetically-modified area 38 (for example, a non-magnetic area or an area coercive force of which has been decreased by 80% compared with the recording magnetic layer 34).

Moreover, it is preferable in the recording magnetic layer 34 that the width L1 of the magnetic recording pattern 34a is set to 200 nm or less and the width L2 of the modified area 38 is set to 100 nm or less in order to increase the recording density of the discrete type magnetic recording medium 30. Also, the track pitch P (=L1+L2) of the magnetic recording medium 30 is preferably 300 nm or less, and it is preferable to make the track pitch P as narrow as possible in order to increase the recording density.

A material that is usually used for a magnetic recording medium can be used for the protective layer 35. Examples thereof include $SiO_2$, $Zr_2O_3$, TiN and carbonaceous materials such as carbon (C), carbon hydrides (HXC), carbon nitrides (CN), amorphous carbon and silicon carbides (SiC). Also, the protective layer 35 may be a laminate of 2 or more layers. The thickness of the protective layer 35 is preferably less than 10 nm. When the thickness of the protective layer 35 exceeds 10 nm, the distance between the magnetic head and the magnetic layer 37 is extended, and it becomes difficult to obtain sufficient input/output characteristics.

The lubricating film 36 can be formed by coating, on the protective layer 35, a lubricant such as a fluorine-based lubricant, a carbon hydride-based lubricant or mixture thereof. Also, the thickness of the lubricating film 36 is usually within a range of about 1 to 4 nm.

The discrete type magnetic recording medium 30 as described above can be produced in high productivity by using the production method of the magnetic recording medium to which the present invention is applied.

(Magnetic Recording/Reproducing Apparatus)

Next, a magnetic recording/reproducing apparatus (HDD), to which the present invention is applied, is described.

Figure 4:
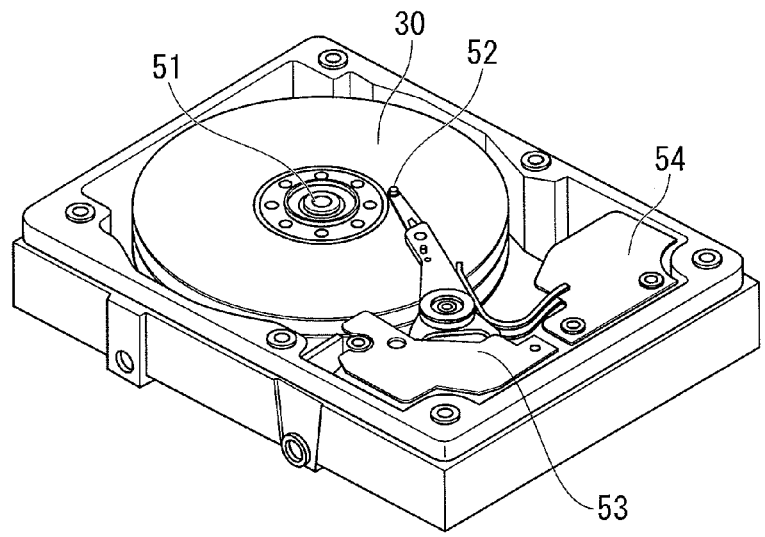
FIG. 4 is a perspective view showing a configuration example of the magnetic recording/reproducing apparatus.

As shown in FIG. 4, the magnetic recording/reproducing apparatus to which the present invention is applied includes a magnetic recording medium 30; a rotation driving section 51 that rotationally drives the magnetic recording medium 30; a magnetic head 52 that performs a recording operation and a reproducing operation to the magnetic recording medium 30; a head driving section 53 that moves the magnetic head 52 to a radial direction of the magnetic recording medium 30; and a recording/reproducing signal processing system 54 that inputs signals to the magnetic head 52 and reproduces signals output from the magnetic head 52.

The aforementioned discrete track type magnetic recording medium 30 is used in this magnetic recording/reproducing apparatus. Therefore, bleeding is eliminated during magnetic recording of the magnetic recording medium 30, and high surface recording density can be obtained. In other words, a magnetic recording/reproducing apparatus having high recording density can be configured by using the magnetic recording medium 30. In conventional magnetic recording/reproducing apparatuses, the reproducing head width has a smaller width than that of the recording head width so as to eliminate influence of a magnetization transition region of a track edge portion. By forming a recording track of the magnetic recording medium 30 in a magnetically discontinuous manner, the reproducing head may have the same width as that of the recording head. Accordingly, sufficient reproduction output and a high SNR can be obtained.

Furthermore, when a reproducing section of the magnetic head 52 is formed by a GMR head or a TMR head, sufficient signal intensity can be obtained even in high recording density, and thus a magnetic recording/reproducing apparatus with high recording density can be obtained. When a float amount of the magnetic head 52 is within a range from 0.005 μm to 0.020 μm, which is lower than conventional one, output is improved and a high device SNR is obtained, and thus a high-capacity and highly reliable magnetic recording/reproducing apparatus can be provided.

When a signal processing circuit for maximum likelihood decoding is used in combination, it is possible to further increase the recording density. A sufficient SNR can be obtained even when data is recorded and reproduced at, for example, track density of 100 or more ktracks per inch, linear recording density of 1,000 or more kbits per inch and recording density of 100 or more Gbits per square inch.

The present invention can also be applied widely to a magnetic recording medium having magnetically-separated magnetic recording patterns MP. Examples of the magnetic recording medium having recording patterns include a so-called patterned medium having magnetic recording patterns arranged thereon with a specified bit-by-bit regularity, a medium having magnetic recording patterns arranged thereon in the form of tracks, a magnetic recording medium with servo signal patterns and the like. Of these, in terms of ease of the production, the present invention is preferably applied to a so-called discrete type magnetic recording medium in which magnetically-separated magnetic recording patterns are magnetic recording tracks and servo signal patterns.

EXAMPLES

Hereinafter, effects of the invention will be described in more detail by way of Example. It should be noted that the present invention is not limited to the following Examples and modifications may be made without departing from the spirit and scope of the present invention.

Example 1

In Example 1, firstly, a vacuum chamber with a HD glass substrate disposed therein was evacuated to $1.0 \times 10^{-5}$ Pa or less in advance. The glass substrate used herein was formed of a crystallized glass containing $Li_2Si_2O_5$, $Al_2O_3$—$K_2O$, $Al_2O_3$—$K_2O$, MgO—$P_2O_5$ and $Sb_2O_3$—ZnO as constituent components, and had an outer diameter of 65 mm, an inner diameter of 20 mm and an average surface roughness (Ra) of 2 angstroms (=0.2 nm).

Next, on the glass substrate, the following films were laminated in this order using a DC sputtering method: the FeCoB film with a thickness of 60 nm as the soft magnetic layer, the Ru film with a thickness of 10 nm as the intermediate layer, the 70Co-5Cr-15Pt-10SiO$_2$ alloy film with a thickness of 15 nm and the 70Co-5Cr-15Pt alloy film with a thickness of 14 nm as the recording magnetic layer, the CrTi film with a thickness of 2 nm and the Mo film with a thickness of 5 nm as the dissoluble layer, and the carbon film with a thickness of 30 nm as the mask layer.

Then, the resist was coated thereon using a spin coating method to form the resist layer with a thickness of 100 nm. A novolak-based resin that is an ultraviolet-curable resin was used as the resist. The glass stamp having the positive pattern of the magnetic recording area was pressed against the resist layer under a pressure of 1 MPa (about 8.8 kgf/cm$^2$). In this state, the resist layer was cured by irradiating with ultraviolet rays having a wavelength of 250 nm for 10 seconds from above the glass stamp having an ultraviolet transmittance of 95% or more. The stamp was then removed from the resist layer, and the concavo-convex pattern corresponding to the magnetic recording area was transferred to the resist layer.

The concavo-convex pattern transferred to the resist layer corresponds to the magnetic recording pattern of 271 kilo-tracks/inch, and had a circular configuration having a width of 64 nm at the convex part of the resist and a circular configuration having a width of 30 nm at the concave part of the resist. The thickness of the resist layer was 65 nm, and the depth of the concave part of the resist was about 5 nm. An angle of the concave part of the resist layer was about 90 degrees with respect to the surface of the substrate.

Next, the concave part of the resist layer, and the mask layer and the dissoluble layer thereunder were removed by dry etching. The dry etching was conducted using 40 sccm of an O$_2$ gas under the conditions of a pressure of 0.3 Pa, a high-frequency plasma electric power of 300 W, a DC bias of 30 W and an etching time of 20 seconds.

Next, the ion beam was irradiated to the part of the recording magnetic layer, which was not covered with the mask layer, so as to modify the magnetic characteristics of this part. The ion beam was generated using the mixed gas of 40 sccm of a nitrogen gas, 20 sccm of a hydrogen gas and 20 sccm of a neon gas. The ion amount was 5×10$^{16}$ atom/cm$^2$, the accelerated voltage was 20 keV, and the etching time was 90 seconds. In the part of the magnetic layer which was irradiated with the ion beam, the magnetic particles were converted into an amorphous state, and the coercive force decreased by about 80%.

Next, the processed substrate was immersed in the 1% hydrogen peroxide solution (liquid temperature: 22° C.) for 30 minutes so as to dissolve the dissoluble layer and to remove the dissoluble layer together with the mask layer and the resist layer thereon.

Next, the processed substrate was immersed in the neutral detergent for 10 minutes so as to perform the scrub washing and the spin washing. Then, the surface of the processed substrate was subjected to the etching of about 1 nm using the ion beam etching, the DLC film with a thickness of 4 nm was formed by a CVD method, and a lubricant was coated in such a manner as to form the layer with a thickness of 2 nm to produce the magnetic recording medium.

Then, the glide test was performed for the produced magnetic recording medium. In this glide test, the float height between the testing head (head slider) and the surface of the magnetic recording medium was adjusted to 0.2 microinch (6.5 nm). When the testing head outputs the signal attributed to the collision with the protrusion of the surface of the magnetic recording medium, the tested magnetic recording medium is determined as a defective product. As a result, the signal attributed to the protrusion was not detected in the glide test for the magnetic recording medium of Example 1.

REFERENCE SIGNS LIST

1: Non-magnetic substrate
2: Magnetic layer
2a, 2b: Magnetic recording pattern
3: Dissoluble layer
4: Mask layer
5: Resist layer
6: Protective layer
7: Non-magnetic area
30: Magnetic recording medium
31: Non-magnetic substrate
32: Soft magnetic layer
33: Intermediate layer
34: Recording magnetic layer
34a: Magnetic recording pattern
35: Protective layer
36: Lubricating film
37: Magnetic layer
38: Modified area
51: Rotation driving section
52: Magnetic head
53: Head driving section
54: Recording/reproducing signal processing system

The invention claimed is:

1. A production method of a magnetic recording medium, which has a magnetically-separated magnetic recording pattern, comprising:
   a step of forming a magnetic layer on a non-magnetic substrate;
   a step of forming a dissoluble layer on the magnetic layer, wherein the dissoluble layer comprises a combination of a CrTi layer on a molybdenum layer;
   a step of forming a mask layer on the dissoluble layer;
   a step of patterning the dissoluble layer and the mask layer to a shape corresponding to the magnetic recording pattern;
   a step of performing a partial modification or removal of the magnetic layer by use of the patterned mask layer; and
   a step of dissolving the patterned dissoluble layer with at least one chemical agent selected from the group consisting of a hydrogen peroxide solution, sulfuric acid, nitric acid, and phosphoric acid so as to remove the patterned dissoluble layer together with the patterned mask layer formed thereon from the top of the magnetic layer.

2. The production method of a magnetic recording medium according to claim 1, wherein the chemical agent is the hydrogen peroxide solution.

* * * * *